United States Patent [19]

Davis

[11] 4,442,001
[45] Apr. 10, 1984

[54] ROTARY VACUUM FILTER

[75] Inventor: Kent L. Davis, Salt Lake City, Utah

[73] Assignee: WesTech Engineering, Inc., Salt Lake City, Utah

[21] Appl. No.: 423,832

[22] Filed: Sep. 27, 1982

[51] Int. Cl.³ .............................................. B01D 33/06
[52] U.S. Cl. .................................... 210/402; 210/406; 162/335; 162/368
[58] Field of Search ..................... 210/402, 406, 416.1, 210/161, 217, 326, 403, 174; 162/335, 368

[56] References Cited

U.S. PATENT DOCUMENTS

| 9,608 | 3/1853 | Bessemer | 210/402 |
|---|---|---|---|
| 1,796,491 | 3/1931 | Sweetland | 210/402 |
| 2,670,849 | 3/1954 | Dunmire | 210/402 |
| 4,083,787 | 4/1978 | White | 210/402 |

FOREIGN PATENT DOCUMENTS

| 211475 | 7/1909 | Fed. Rep. of Germany | 210/403 |
|---|---|---|---|
| 5219 | of 1907 | United Kingdom | 210/402 |

Primary Examiner—Charles N. Hart
Assistant Examiner—John W. Czaja
Attorney, Agent, or Firm—Robert R. Finch

[57] ABSTRACT

A rotary filter drum in which the drum is a single cell having a perforated cylindrical wall and solid end walls. A hollow central shaft extends through the drum and its opposite ends extend axially from the end walls. The drum contains a plurality of relatively narrow elongated open-top pans that are equally spaced radially from and angularly about the central shaft. Each pan is defined by a bottom, spaced apart inner and outer sidewalls which extend the full length of the drum and the drum end walls. The pan walls are secured to the ends of the drum. The pans are located so the open tops face the direction of drum rotation and the entire leading edge of the outer sidewall of the pan is secured to the perforated cylindrical wall. A closed conduit connects the bottom portion of each pan to the central shaft which in turn connects to the vacuum source so the filtrate is removed from and vacuum applied to the interior of the drum solely through the central shaft but via the pans and connecting conduits.

4 Claims, 5 Drawing Figures

ROTARY VACUUM FILTER

FIELD AND BACKGROUND OF THE INVENTION

This invention relates generally to rotary drum vacuum filters of the so-called single cell type in which the entire drum interior is subjected to a uniform vacuum usually applied through the center barrel with or about which the drum rotates. As the drum rotates through slurry in a tank, filtrate is drawn through perforations in the drum surface while solids deposit thereon as a cake. The filtrate is withdrawn from the drum through the center barrel while cake is scraped from the drum surface.

Filters of this type are especially adapted to use as pre-coat filters in which, as is well known, a cake of solids is initially formed to act as the filter medium upon which further cake forms and from which it is scraped by a slowly advancing blade.

More particularly, this invention is directed to an improved filter drum construction providing superior strength and enhanced filtrate removal characteristics.

In some prior filters, the drum interior is divided into sectors by solid plates radiating from the center barrel to connect to the drum wall. Openings in the center barrel apply vacuum and withdraw filtrate. Drums of this type are expensive, moreover since the sectors are separate, excess filtrate in a sector not entirely removed in a given cycle is not diverted to another sector. A typical form of this type drum is disclosed in German Pat. No. 233,316.

Another prior construction employs shallow pans in the drum interior. These are not secured to the drum wall. The vacuum in the drum interior is uniform and excess filtrate spilling from the pans reports to the bottom of the drum. Some designs have stationary pans and may also employ siphons to remove filtrate. Typical filters of this type are disclosed in U.S. Pat. Nos. 898,312 and 1,064,702. A more recent design, disclosed in U.S. Pat. No. 4,083,787, has shallow open topped pans radiating and rotating with the center barrel to swap filtrate that accumulates in the drum. Vacuum is applied and filtrate withdrawn through the center barrel of the drum. The pans are spaced from the drum wall to avoid interference with filtration.

The primary object of the present invention is the provision of a drum in a rotary drum vacuum filter that is specifically designed as a single cell drum in which the interior of the drum is functionally undivided insofar as vacuum application is concerned.

An important additional object is the provision of a filter of the type described having a plurality of filtrate removal pans that are integral to the drum structure thereby to enhance drum strength.

An additional object is the provision of filtrate removal pans that divert all filtrate away from inside the filtering surface on each pickup sweep thus avoiding liquid pressure on the under side of filter cake.

A further object is the provision in a filter drum of the type described of a filtrate pan and manner of connecting it to the inner drum wall that, in addition to enhancing filtrate pickup, also provides drainage ports to prevent or limit accumulation of residual liquid between the pan and interior drum surface during descent of the drum.

The foregoing and probably other objects of the invention are attained by a filter construction comprising a tank and a drum mounted for rotation therein in which the drum has closed opposite ends and a perforated cylindrical wall. Conduit means which advantageously include the center barrel connect the drum to vacuum. At least one filtrate scoop is mounted in the drum for rotation therewith. The scoop is formed as an elongated pan extending between the closed drum heads or end walls and is defined by the drum ends, a bottom wall, and two spaced apart side walls. The pan has an open top that faces in the direction of intended rotation of the drum; and the leading edge of the outer sidewall of the pan is connected along its entire length to the inner surface of the perforated curved drum wall. A closed conduit provides communication between the bottom of the pan and the center barrel or shaft thence to vacuum.

In the preferred embodiment, a plurality of pans are provided. They are all welded to the drum ends and are an integral part of the drum structure, especially effective in resisting collapse of the drum when internal vacuum is applied.

Securing the leading edge of the pan wall to the drum surface in accordance with the invention not only provides strength to the drum, but also materially enhances filtrate removal. This is so because as the drum rotates through the filtrate then ascends, the pan wall diverts all liquid away from the perforated drum wall into the pan. Filtrate in the pan is discharged through the conduit as the pans rotate. The pans are relatively deep hence confine filtrate and firmly direct it to the withdrawal conduit. If there is excess filtrate it is diverted away from the perforated wall to the bottom of the drum.

The inner surface of the drum is constantly wet because of the continual application of vacuum; and as the drum descends, this filtrate flows downwardly along the drum wall. In accordance with a feature of this invention, accumulation of residual liquid between the inner drum wall and outer pan wall is avoided by the provision of spaced drainage ports in the pan wall adjacent its line of connection to the drum surface. These ports are sized and spaced to quickly drain and thus prevent accumulation of residual liquid during drum descent. However, the ports are small enough that they do not impair filtrate pickup when the pans rotate through submergence durng the filtrate scooping and ascending travel of the drum.

In order that the invention may be more readily understood and carried into effect, reference is made to the accompanying drawings and the description thereof which are offered by way of example only and not in limitation of the invention the scope of which is defined only by the appended claims and equivalents embraced thereby rather than any preceding description.

DETAILED DESCRIPTION OF THE DRAWINGS

Figure 1:
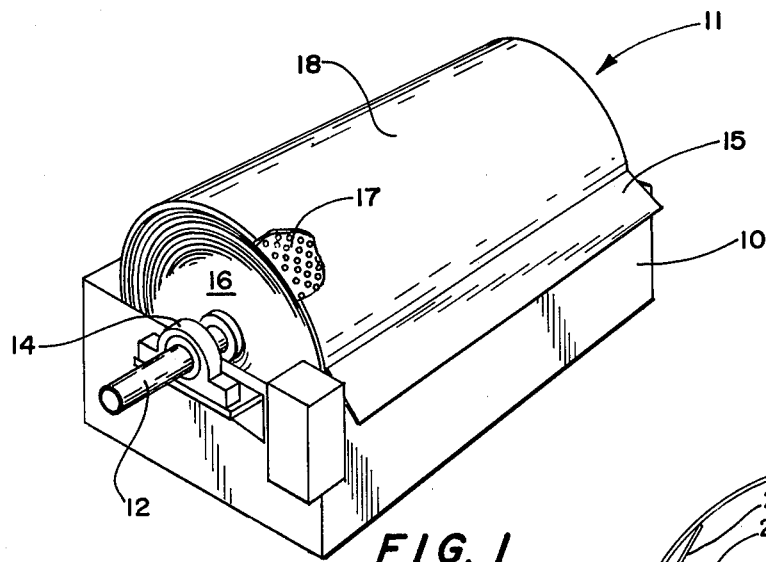
FIG. 1 is a perspective view of a rotary drum vacuum filter embodying the invention.

The filter includes a tank 10 to which a liquid-solids mixture is supplied by any convenient means. A drum 11 is mounted in the tank. The drum is provided with a hollow shaft 12, commonly called a center shaft or barrel, extending longitudinally therethrough coaxial with the drum axis and having opposite ends acting as trunnions in turn journalled in bearings 14 on the end walls of the tank.

The center barrel is hollow and adapted to connect through suitable couplers not shown to a receiver not shown through which vacuum originating from a suitable vacuum pump is applied to the center barrel thence to the drum interior. Filtrate is removed from the drum via the center barrel and receiver. Solids accumulate as a cake on the drum surface and are scraped therefrom by an advancing scraper blade 15 design of which is readily available in the field.

Figure 2:
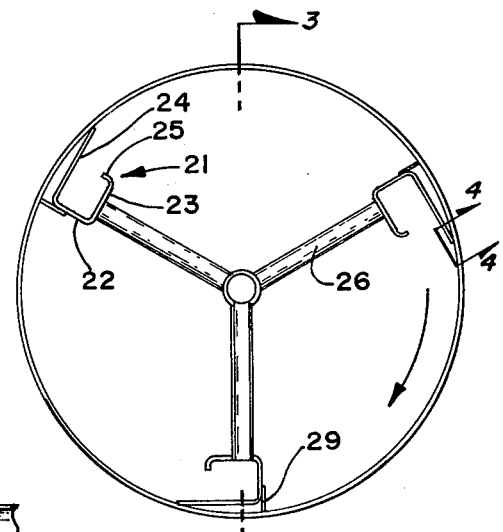
FIG. 2 is a transverse section of the drum employed in the filter of FIG. 1.
Figure 3:
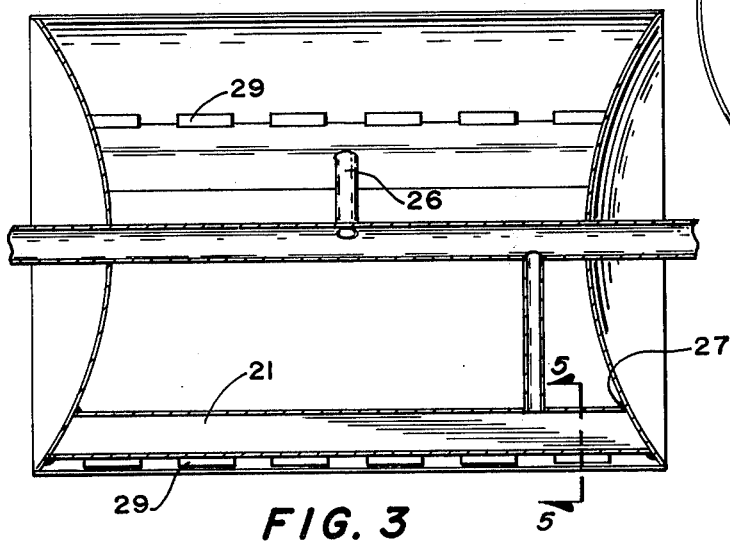
FIG. 3 is a longitudinal section of the drum shown in FIG. 1 taken in the plane of line 3—3 in FIG. 2 and looking in the direction of arrows 3.

As will be most readily appreciated by reference to FIGS. 2 & 3 the drum 11 comprises solid heads or end walls 16 and a perforated cylindrical wall 17 extending therebetween. The perforated wall is normally covered by a filter cloth 18 during operation. A plurality of open topped pans 21 are located inside the drum. The pans which are positioned adjacent the curved wall 17 of the drum are defined by the drum ends 16, a bottom 22, an inner side wall 23 nearest the drum axis, and an outer side wall 24 nearest the drum wall. An inturned ledge 25 on the inner sidewall helps retain liquid as the pan ascends. The pan is positioned so that its open top faces in the direction of drum rotation as shown by the arrow.

The pans are evenly spaced angularly about and radially from the center barrel. They communicate with the center barrel and thus the source of vacuum by conduits 26 extending between the bottom interior of the pan and the center barrel. The interior of the drum is functionally undivided so that vacuum applied through the conduits 26 is exerted uniformly throughout the drum.

The pans extend the full length of the drum and are secured to the opposite drum heads 16 as by welding as indicated at 27 and are an integral structural part of the drum.

In accordance with the invention maximum volume of filtrate pickup coupled with enhanced filtration through the drum wall overlying the confined zone between the pan wall and drum is achieved by connecting the leading edge 28 of the outer pan wall to the inner surface of the drum. With this connection the pan wall functions as a diverter so that filtrate in the drum ahead of a moving pan is swept away from the drum wall and, except for insignificant amounts flowing through ports 31, none is permitted to enter the confined zone between the pan and drum. Instead, all the filtrate is directed into the pan or, if the pan is full, over the pan toward the drum interior. As the drum rotates, excess filtrate will spill only over the inner wall of the pan, but cannot flow downward between the ascending pan and drum wall. The result is to encourage flow of filtrate through the drum into the confined zone between the pan and drum. As the drum rotates, the pan ascends whereupon filtrate under the influence of vacuum and gravity flows through the conduit 26 into and through the center barrel and receiver to eventual discharge. Vacuum is applied to the drum interior through the conduits 26 which connect at spaced locations along the center barrel.

Additional support for the pans is provided by a plurality of spaced apart bars 29 welded to the interior drum surface and the pan bottom. However, these bars must be small enough and spaced sufficiently apart to allow free flow of filtrate through the drum wall and the confined zone.

In the illustrated embodiment, the outer wall 24 of the pan is straight and there is defined between it and the curved drum wall a confined zone that converges toward the leading edge 28 of the pan. In order to prevent undesirable accumulation of liquid in this zone as the pan descends, a plurality of ports 31 are provided in the outer wall of the pan adjacent the line of connection of the leading edge 28 to the drum. Since there is relatively little liquid to be drained, the ports are relatively small and only a few need be provided. Typically, in a 6' dia×5' face filter in which the outer pan wall is $10\frac{1}{2}''$ high, ports of $\frac{3}{4}''$ diameter are provided at 12" spacing the length of the pan. Although this size and spacing of ports provides adequate drainage during pan descent, it does not adversely affect pickup of the filtrate. This is so because the volume of liquid available on pickup and ascent is many times greater than the residual liquid that must be drained on descent.

Figure 4:
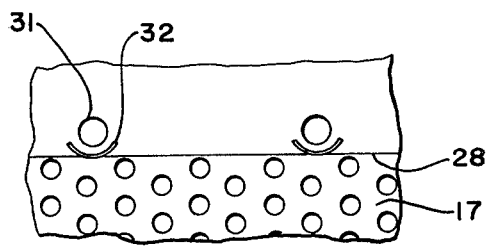
FIG. 4 is an enlarged view taken in the plane of line 4—4 of FIG. 2 and looking in the direction of arrows 4.
Figure 5:
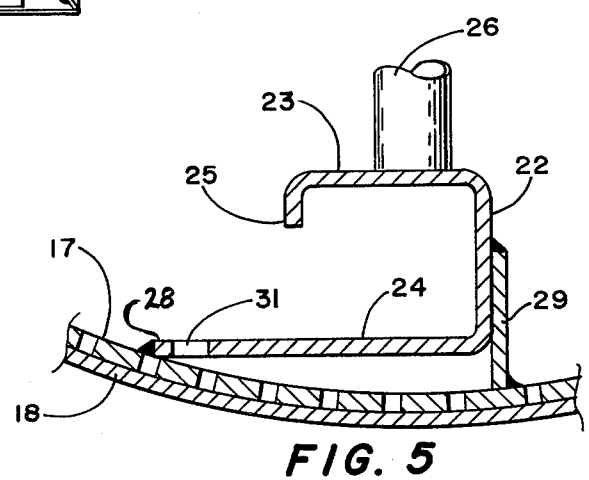
FIG. 5 is an enlarged section taken in the plane of line 5—5 of FIG. 3 looking in the direction of the arrows 5.

FIG. 4 also illustrates a special modification useful in cases where the liquid available for pickup may be lower than normal or where for any other reason flow through the drainage ports should be minimized on pickup. This is accomplished by means of U shaped diverters 32 located upstream from the ports 31 and with the points aimed upstream. These serve to divert or deflect liquid from entry through the ports on pickup and ascent, yet will accommodate complete drainage of the relatively small amounts of residual filtrate to be handled as the pans descend. The diverters are small and may be formed by weld deposits.

The pans are relatively deep and narrow. Illustratively, in a six foot diameter drum, five pans were provided. Each pan was 8" wide, had an outer wall depth of 10.5" and an inner wall depth of $7\frac{1}{2}''$. The drainage conduit was 2" and the drum center barrel was 4" diameter.

Although, the pans are shown as having flat walls and bottom, it is contemplated that other trough shapes may be employed.

I claim:

1. In a rotary drum vacuum filter: an improved drum comprising a single cell defined by a perforated cylindrical wall and solid end walls; a hollow shaft extending axially of the drum axis and from at least one end of the drum; means for connecting said shaft to a source of vacuum; a plurality of elongated open-topped pans inside said drum spaced angularly about and radially from said shaft; each of said pans being defined by spaced apart inner and outer side walls, a bottom wall, and the drum end walls; a closed conduit for each pan connecting the interior thereof with the interior of said hollow shaft; each of said pans is positioned with its outer wall adjacent and spaced from the inner drum wall and its open top facing in the direction of rotation of said drum; means securing the upper edge of said outer pan wall to said drum wall along a continuous line of connection adjacent the open top of said pan; and a plurality of ports in said outer pan wall adjacent to and spaced apart along said continuous line of connection.

2. A drum according to preceding claim 1 in which said inner side wall of said pan nearest the drum axis has an inwardly turned flange at its upper edge.

3. A drum according to preceding claim 1 in which said conduits connecting said pans to said center shaft provide the sole communication between the interior of said drum and the interior of said center shaft.

4. A drum according to preceding claim 1 with the addition of relatively small flow diverters on said pan wall upstream in the direction of drum rotation from said ports.

* * * * *